United States Patent Office 3,124,587
Patented Mar. 10, 1964

3,124,587
PROCESS FOR THE PRODUCTION OF PYRIDOXAL-5'-ORTHOPHOSPHORIC ACID ESTER
Gustav Schorre, Darmstadt-Eberstadt, Germany, assignor to E. Merck Aktiengesellschaft, Darmstadt, Germany
No Drawing. Filed Apr. 1, 1960, Ser. No. 19,201
Claims priority, application Germany Apr. 4, 1959
5 Claims. (Cl. 260—296)

This invention is related to a process for producing pyridoxal-5'-orthophosphoric acid ester. This compound has an activity similar to vitamin $B_6$ and consequently it can be used as a substitute therefor.

In the prior art there are disclosed several methods for producing pyridoxal-5'-orthophosphoric acid esters; one common method has been to oxidize pyridoxamin-5'-orthophosphoric acid ester. The processes using this oxidative technique are reported in the Journal of the American Chemical Society, vol. 76, page 169, 1954; in Austrian Patent No. 190,641; and in United States Patent, 2,666,-061. These processes have one serious disadvantage in that the raw material, pyridoxamine, is expensive inasmuch as this latter compound is usually produced from either pyridoxal or from pyridoxin-4-methyl-ether in a very low yield (reference being made to Journal of the American Chemical Society, vol. 66, page 2088, 1944; Chimica, vol. 11, page 310, 1957; Helvetica Chimica, vol. 31, page 1004 to 1016, 1948; German Patent No. 1,012,604).

Another reported method for producing pyridoxal-5'-orthophosphoric acid ester, or more specifically, the calcium salt or the magnesium salt of pyridoxal-5'-orthophosphoric acid ester, is to react pyridoxal-hydrochloride with N,N-dimethylglycylhydrazine hydrochloride to produce pyridoxalhydrazone. The reaction product is then successively treated with hydrochloric acid, silver nitrite and either calcium hydroxide or magnesium methylate (German Patent 921,451). This process for producing pyridoxal-5'-orthophosphoric acid ester is obviously highly complicated and furthermore, results in low yields.

The object of the present invention, therefore, is to produce pyridoxal-5'-orthophosphoric acid ester by a radically new process, wherein the yields of pyridoxal-5'-orthophosphoric acid ester are high and the cost of the raw materials is low.

Upon further study of the specification and appended claims, other objects and advantages of the invention will become apparent.

To attain these objects, pyridoxal-5'-orthophosphoric acid ester is produced by the following process steps:

STEP 1

Reacting either pyridoxal or hydroxysulfonic acid of pyridoxal (2-methyl-3-hydroxy-4-(hydroxysulfo-methyl)-5-hydroxymethylpyridine) with a beta-amino-alcohol to form a pyridoxal oxazolidine. This step conforms to the following reaction:

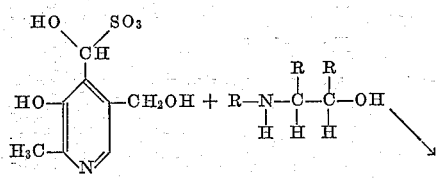

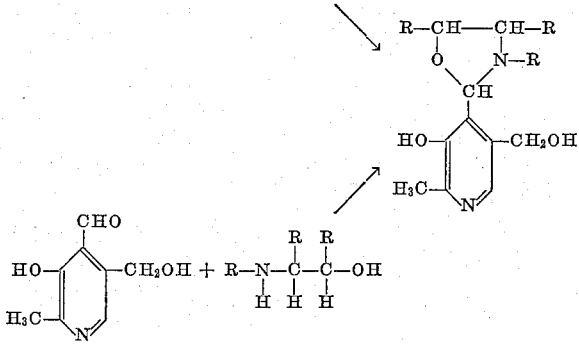

wherein R is hydrogen or alkyl or aryl, or arylalkyl, or cycloalkyl or substituted derivatives thereof.

STEP 2

Reacting the pyridoxal oxazolidine product from step 1 with substances capable of esterifying the exo or 5'-hydroxyl group to the orthophosphoric acid ester. For the sake of convenience, this is called the phosphorylizing step. There are many substances and known techniques for accomplishing this esterification. For example, a mixture of orthophosphoric acid and phosphorus pentoxide can be used. This phosphorylizing step conforms to the following reaction:

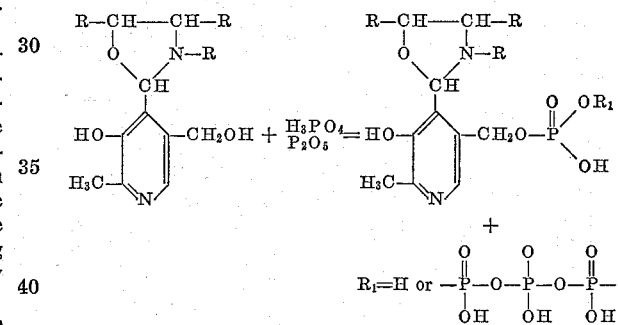

STEP 3

The product of step 2, pyridoxal-oxazolidine-5'-orthophosphoric acid esters, is then hydrolized to obtain the final product pyridoxal-5'-orthophosphoric acid ester. This step conforms to the following reaction:

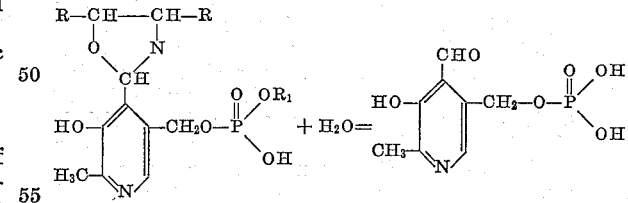

In step 1 it is important to note that it is not necessary to use a pure crystalline pyridoxal as the starting material. Instead, it is possible to utilize a solution containing pyridoxal such as a solution obtained by one of the conventional pyridoxal syntheses processes, e.g. oxidation of pyridoxin with manganese dioxide.

If, instead of the pyridoxal the hydroxysulfonic acid of pyridoxal is used as the starting material for the present invention, this latter compound can be produced by treating either pyridoxal or a solution containing pyridoxal with sodium bisulfite. Under certain conditions, the use of the hydroxysulfonic acid of pyridoxal is preferred as the starting material.

In further connection with step 1, the preferred beta-amino-alcohols are aromatic compounds, preferably phenylated beta-amino-alcohols, in particular, ephedrine.

There are also other conditions which have been surprisingly found to promote high yields in step 1. In the production of oxazolidines generally, the carbonyl component is reacted with a beta-amino-alcohol in an organic medium, such as benzene, chloroform or ether. An exception to the necessity of the utilization of the organic medium occurs when the carbonyl component is formaldehyde, in which case, an aqueous medium can also be used (Chemical Reviews, vol. 53, page 309, et seq., 1953). Therefore, it was believed heretofore, that if one were to produce an oxazolidine of pyridoxal or the hydroxysulfonic acid of pyridoxal, it would be necessary to utilize an organic medium.

It has been found, however, that when the starting materials of the present invention are converted into oxazolidines, it is actually beneficial to utilize an aqueous medium as this results in a higher yield. In addition to the utilization of an aqueous medium, there are other optimum conditions in this step. By employing a pH of about 9–9.5 and by conducting the reaction at room temperature (about 20–25° C.) in an aqueous medium, a yield of over 90% can be attained.

With respect to the phosphorylizing step 2, there are many different ways for one skilled in the art to accomplish this step, as it is an esterification reaction. I have found, however, that it is preferable to employ a mixture of orthophosphoric acid and phosphorus pentoxide for this step. For a more detailed discussion of phosphorylizing methods, reference is made to the Journal of American Chemical Society, vol. 17, page 2101, 1948. The resulting product from this phosphorylizing step is a mixture of pyridoxal-oxazolidine-5'-phosphoric acid esters, such as the orthophosphoric acid ester and the polyphosphoric acid esters as shown in the preceding equation.

In step 3, the hydrolysis step, the oxazolidine group is removed, leaving a residue of the original carbonyl group. Simultaneously, the polyphosphoric acid ester groups are hydrolyzed to form pyridoxal-5'-orthophosphoric acid ester. This step is easily conducted, but preferably, is accomplished by treating the product of step 2 with a dilute acidic aqueous solution. It should also be noted that it is not necessary to isolate the product of step 2 in pure form in order to use it in the hydrolysis step. A satisfactory reactant for the hydrolysis step can be obtained by precipitating the esters of step 2 in the reaction solution by adding substances which decrease the solubility of these esters, such as a mixture of alcohol and ether.

After hydrolysis has occurred in step 3, the final product, pyridoxal-5'-orthophosphoric acid ester, can be isolated by neutralization of the hydrolysis mixture. After neutralization, it is preferable to contact the mixture with a slightly acid ion exchange resin, such as Amberlite IRC–50. Elution is preferably carried out with air-free water. Upon concentration the extracted material is precipitated in crystalline form, resulting in a yield of over 80% pyridoxal-5'-orthophosphoric acid ester with respect to the oxazolidine. Thus, it is apparent that the present process results in much better yields than in any of those processes disclosed in the prior art. Furthermore, the present invention is more direct and less expensive than those processes using pyridoxamine as the raw material.

The following examples are presented for the purposes of illustration and are not intended to be limitative of the specification and appended claims.

*Example 1*

Sixteen g. pyridoxal are heated to the boiling point with 16.5 g. l-ephedrine in 500 cc. benzol (water separator) until about 2 cc. water are separated. The solution is filtered and the 2-(3'-hydroxy-5'-hydroxymethyl-2'-methylpyridyl-4')-3,4-dimethyl-5-phenyl-1-oxazolidine contained in the filtrate is recrystallized from an acetic ester. (The crystalline product weighed 21 g. and melted at 178–179° C.) Then a mixture of 65 g. of 85% $H_3PO_4$ and 50 g. of $P_2O_5$ is heated for two hours at 60° C. with 20 g. of this crystalline product. Five cc. of water are added to the reaction mixture which is cooled by an ice bath and subsequently 250 cc. alcohol are added dropwise. The solution is then blended into one litre of ether under agitation. The separated oil product is heated with 100 cc. 0.1 N HCl for 10 to 15 minutes to 50–60° C. and is evaporated in vacuum under $N_2$. The residue repeatedly extracted with acetone (or dioxane), is introduced into a mixture of acetone and ether, is stirred for one hour and the separated product is set with 2 N NaOH to pH 6.5. This solution is sent through an ion exchange column (IRC–50) and is extracted with air-free water. The fractions are united according to the UV spectrum, are evaporated in vacuum under nitrogen to 70 cc. and are kept in the refrigerator for 48 hours. The precipitated pyridoxal-5'-orthophosphoric acid ester is filtered off with suction, and is washed with acetone. This precipitate weighed 8.9 g., but by concentration of the mother liquor, another 4.8 g. are obtained.

*Example 2*

To twenty-five g. of pyridoxal-hydroxysulfonic acid suspended in 250 cc. water, 25 g. l-ephedrine are added. The mixture is brought to pH 9.3 with 16% —NaOH and is stirred for half-an-hour at room temperature. The precipitated 2-(3'-hydroxy-5'-hydroxymethyl-2'-methylpyridyl-4')-3,4-dimethyl-5-phenyl-1-oxazolidine is separated by means of a suction filter. The yield was 28.5 g.

The pyridoxal-oxazolidine thus obtained is converted to pyridoxal-5'-orthophosphoric acid ester as described in Example 1.

*Example 3*

To fifty g. pyridoxal-hydroxysulfonic acid suspended in 500 cc. water, 50 g. d,l-ephedrine-hydrochloride are added. The pH of the solution is brought to 9.5 with dilute NaOH, and is stirred for half-an-hour. The precipitated pyridoxal-oxazolidine is filtered off. The product weighed 61 g. and melted at 167–168° C. (alcohol).

The pyridoxal-oxazolidine thus obtained is converted to pyridoxal-5'-orthophosphoric acid ester as described in Example 1.

*Example 4*

To twenty g. pyridoxal-hydrochloride and 25 g. d,l-ephedrine-hydrochloride dissolved in 150 cc. of water, dilute sodium hydroxide is added to bring the solution to a pH of 9.2. After half-an-hour of stirring, the 2-(3'-hydroxy-5'-hydroxymethyl-2'-methylpyridyl-4')-3,4-dimethyl-5-phenyl-d,l-oxazolidine is drawn off, the yield being 28 g., M.P. 166–167° C. The pyridoxal-oxazolidine thus obtained is converted to pyridoxal-5'-orthophosphoric acid ester as described in Example 1.

*Example 5*

Sixteen g. pyridoxal and 15 g. beta-benzylamino ethanol in 300 cc. benzol are refluxed (water separator) until about 2 cc. water are separated. The solvent is evaporated and the residue is recrystallized from ethyl acetate/hexane. Yield: 17 g.; melting point 135° C. The pyridoxal oxazolidine thus obtained is converted to pyridoxal-5'-orthophosphoric acid ester as described in Example 1.

*Example 6*

According to the method described in Example 5, 15 g. beta-cyclohexylamino ethanol are reacted with 15 g. pyridoxal. The pyridoxal oxazolidine thus obtained is converted to pyridoxal-5'-orthophosphoric acid ester as described in Example 1.

Example 7

According to the method described in Example 5, 16 g. pyridoxal and 15 g. beta-oxyethyl aniline are reacted in toluol. The pyridoxal oxazolidine thus obtained is converted to pyridoxal-5'-orthophosphoric acid ester as described in Example 1.

In addition to the novelty of the process of the present invention, there are several new compounds synthesized. These compounds, the products of steps 1 and 2, are useful in that they serve as starting materials or intermediates in producing the pyridoxal-5'-orthophosphoric acid ester.

In making the pyridoxal-oxazolidine, a wide variety of beta-amino-alcohols can be used. The "R" groups attached to the alcohol can be chosen from alkyls such as, methyl, ethyl, pentyl, and hexyl, or from aryl groups such as, benzyl and naphthyl and anilino and cycloalkyl such as, cyclohexyl, and hydrogen. In general, the number of carbon atoms in the "R" group can be up to about twelve.

As the "R" group does not enter into the reaction, of course many other specific groups will spontaneously occur to the skilled chemist.

In viewing this invention in its broader aspects, it is seen that once the pyridoxal-oxazolidine compound is formed, then it becomes possible to esterify the 5-hydroxymethyl group. Thus, it is applicant's inventive concept to form an oxazolidine compound and then to phosphorylize it. Obviously, then, the method of forming the oxazolidine compound is not critical to the process as a whole, inasmuch as that the mere formation by any method of the oxazolidine compound is all that is required.

It will be understood that the invention is susceptible to modification in order to adapt it to different usages and conditions, and, accordingly, it is desired to comprehend such modifications within the invention as may fall within the scope of the appended claims.

What I claim is:
1. A compound of the formula

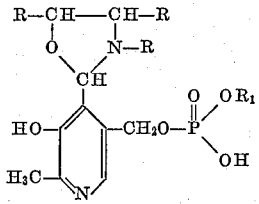

wherein R is selected from the group consisting of: hydrogen, anilino, alkyl, hydrocarbon aryl, hydrocarbon aralkyl, cycloalkyl having up to six carbon atoms in the ring, said hydrocarbon groups having no more than twelve carbon atoms, and $R_1$ is selected from the group consisting of: hydrogen and polyphosphoric acid.

2. A process for producing pyridoxal-oxazolidine-5'-phosphoric acid esters which comprises the step of reacting a pyridoxal-oxazolidine with a mixture of phosphoric acid and phosphorous pentoxide to form pyridoxal-oxazolidine-5'-phosphoric acid esters.

3. A compound of the formula

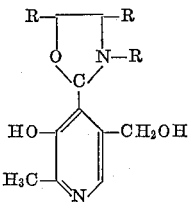

wherein R is selected from the group consisting of hydrogen, anilino, alkyl, hydrocarbon aryl, hydrocarbon aralkyl, cycloalkyl having up to six carbon atoms in the ring, said hydrocarbon groups having no more than twelve carbon atoms.

4. A pyridoxal-oxazolidine of the formula

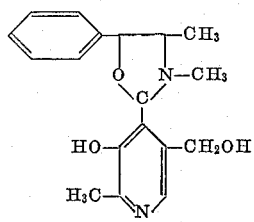

5. A process for producing pyridoxal-5'-orthophosphoric acid ester which comprises the steps of: reacting a raw material of the group consisting of pyridoxal and pyridoxal-hydroxy-sulfonic acid with a beta-amino-alcohol of the formula

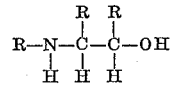

wherein R is selected from the group consisting of anilino, alkyl, hydrocarbon aryl, hydrocarbon aralkyl cycloalkyl having up to six carbon atoms in the ring, said hydrocarbon groups having no more than twelve carbon atoms, to form the corresponding pyridoxal-oxazolidine; phosphorylizing the oxazolidine compound with a mixture of phosphoric acid and phosphorous pentoxide to form pyridoxal-oxazolidine-5'-othophosphoric acid ester and pyridoxal-oxazolidine-5'-polyphosphoric acid esters; and hydrolyzing said phosphorylized oxazolidine compounds with dilute mineral acid to form pyridoxal-5'-orthophosphoric acid ester.

References Cited in the file of this patent
UNITED STATES PATENTS 2,929,819     Erlenmeyer     Mar. 22, 1960

OTHER REFERENCES

Elderfield: "Heterocyclic Compounds," vol. 5, pp. 391–2 (1957).